(12) United States Patent
Fang et al.

(10) Patent No.: US 8,514,778 B1
(45) Date of Patent: Aug. 20, 2013

(54) INTERWORKING OVERHEAD MESSAGE PROTOCOLS

(75) Inventors: Yonggang Fang, San Diego, CA (US); Xiaowu Zhao, Shenzhen (CN); Yuanfang Yu, Shenzhen (CN); Ting Lu, Beijing (CN)

(73) Assignee: ZTE (USA) Inc., Morristown, NJ (US)

( * ) Notice: Subject to any disclaimer, the term of this patent is extended or adjusted under 35 U.S.C. 154(b) by 475 days.

(21) Appl. No.: 12/731,123

(22) Filed: Mar. 24, 2010

Related U.S. Application Data

(60) Provisional application No. 61/163,027, filed on Mar. 24, 2009.

(51) Int. Cl.
*H04W 4/00* (2009.01)

(52) U.S. Cl.
USPC .......................................... 370/328; 455/436

(58) Field of Classification Search
None
See application file for complete search history.

(56) References Cited

U.S. PATENT DOCUMENTS

| | | | |
|---|---|---|---|
| 2008/0020769 A1* | 1/2008 | Parekh et al. | 455/436 |
| 2010/0046428 A1* | 2/2010 | Lee et al. | 370/328 |

* cited by examiner

*Primary Examiner* — Clemence Han
(74) *Attorney, Agent, or Firm* — Perkins Coie LLP

(57) ABSTRACT

Wireless communication systems, apparatuses, and techniques are described for interworking wireless technologies. Interworking wireless technologies can include operating a wireless communication system that includes multiple radio access technologies (RATs) to provide wireless services to multiple mobile devices, providing an enhanced inter-RAT OMP instance for a mobile device that is in communication with the wireless communication system via the first RAT, where the enhanced inter-RAT OMP instance includes an inactive state and a tunnel active state, operating the enhanced inter-RAT OMP instance to switch from the inactive state to the tunnel active state in response to a message associated with the second RAT, and using the enhanced inter-RAT OMP instance in the tunnel active state to send one or more overhead messages via a communication tunnel to the mobile device. Interworking wireless technologies can include providing an enhanced overhead message protocol (OMP) instance in a wireless sector to broadcast communication messages.

31 Claims, 10 Drawing Sheets

INTERWORKING OVERHEAD MESSAGE PROTOCOLS

PRIORITY CLAIM AND CROSS REFERENCE TO RELATED APPLICATION

This document claims the benefit of the priority of U.S. Provisional Application Ser. No. 61/163,027, filed Mar. 24, 2009 and entitled "INTERWORKING OVERHEAD MESSAGE PROTOCOLS," the entire contents of which are incorporated by reference as part of the disclosure of this document.

BACKGROUND

This document relates to wireless communication systems, apparatuses, and techniques.

Wireless communication systems and apparatuses use electromagnetic waves to communicate with mobile devices such as fixed and mobile wireless communication devices, mobile phones, fixed mobile devices, laptop computers with wireless communication cards, mobile station (MS), user equipment (UE), access terminal (AT), evolved access terminal (eAT), and a subscriber station (SS), that are located within coverage areas of the wireless systems. Wireless communication systems and apparatuses can include one or more base stations to provide service in one or more wireless service areas. A base station can be referred to as an access point (AP) or access network (AN) or can be included as part of an access network or a base station subsystem (BSS). Further, a wireless communication system can include one or more core networks to control one or more base stations.

Wireless communication systems can use one or more wireless technologies to communicate. Various examples of wireless technologies include Code division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), evolved UTRAN (E-UTRAN), Long-Term Evolution (LTE), and Worldwide Interoperability for Microwave Access (WiMAX). A mobile device such as a multi-mode mobile device can communicate using two or more wireless technologies.

SUMMARY

This document describes, among other things, internetworking technologies that provide wireless services to multi-mode mobile devices.

Techniques for interworking wireless technologies can include operating a wireless communication system that includes multiple radio access technologies (RATs) to provide wireless services to multiple mobile devices. Technique can include using an enhanced overhead message protocol (OMP) and an enhanced inter-RAT OMP. For example, a wireless communication system can instantiate a single instance of an enhanced OMP and multiple instances of an enhanced Inter-RAT OMP to support different types of mobile devices such as legacy ATs and evolved ATs in an eHRPD network. Other implementations can include corresponding systems, apparatus, and computer programs, configured to perform the actions of the techniques, encoded on computer readable mediums.

These, and other implementations, can include one or more of the following features. In some implementations, an enhanced OMP is instantiated per wireless sector. A wireless communication system can use an enhanced OMP instance to periodically broadcast messages such as Quick Config, Sector Parameters, and Inter-RAT Neighbor List messages over a channel such as an eHRPD Control Channel. A wireless communication system can use an enhanced OMP instance to broadcast neighboring cell information associated with a different radio access technology, e.g., broadcasting non-HRPD neighboring cell information through an eHRPD Control Channel.

In some implementations, an enhanced Inter-RAT OMP is instantiated at an evolved access network on a per mobile device basis. Based on a message such as a Connection Request over a LTE tunnel from a mobile device, an evolved access network can instantiate an instance of an Inter-RAT OMP for that mobile device. An enhanced Inter-RAT OMP instance for an evolved access network includes an inactive state and a tunnel active state. In some implementations, an enhanced Inter-RAT OMP mechanism is not required to broadcast overhead messages over an eHRPD Control Channel. Instead, an enhanced Inter-RAT OMP mechanism can send overhead messages and other message over the tunnel in unicast manner.

In another aspect, techniques for interworking wireless technologies can include operating a wireless communication system that includes multiple RATs to provide wireless services to multiple mobile devices, providing an enhanced inter-RAT OMP instance for a mobile device that is in communication with the wireless communication system via the first RAT, where the enhanced inter-RAT OMP instance includes an inactive state and a tunnel active state, operating the enhanced inter-RAT OMP instance to switch from the inactive state to the tunnel active state in response to a message associated with the second RAT; and using the enhanced inter-RAT OMP instance in the tunnel active state to send one or more overhead messages via a communication tunnel to the mobile device. Techniques can include providing an enhanced OMP instance in a wireless sector to broadcast communication messages. Other implementations can include corresponding systems, apparatus, and computer programs, configured to perform the actions of the techniques, encoded on computer readable mediums.

These, and other implementations, can include one or more of the following features. Using the enhanced inter-RAT OMP instance in the tunnel active state can include transmitting, over a unicast channel of the first RAT, an overhead message that is associated with the second RAT to the mobile device. Implementations can include causing the inter-RAT OMP instance to enter the tunnel active state based on an activate command. Implementations can include causing the inter-RAT OMP instance to enter the inactive state based on a deactivate command. Implementations can include causing an inter-RAT Signaling Adaptation Protocol (SAP) to send the activate command based on entering an open state. Implementations can include causing the inter-RAT SAP to send the deactivate command based on entering a closed state.

Implementations can include providing a command to trigger the inter-RAT OMP instance to send one or more system parameters to the mobile device. The one or more system parameters can be associated with the second RAT. Implementations can include transmitting the one or more system parameters over the communication tunnel in a unicast manner based on the command. Implementations can include causing the mobile device to communicate, based on the one or more system parameters, with the wireless communication system over the second RAT.

Implementations can include using the enhanced OMP instance to broadcast information over a control channel of the first RAT. Broadcast information can include an inter- RAT neighbor list message. Using the enhanced inter-RAT OMP instance in the tunnel active state can include providing information of one or more neighboring wireless cells to the mobile device for a handoff from the first RAT to the second RAT.

In another aspect, interworking techniques can include operating a wireless communication system that includes multiple RATs to provide wireless services to multiple mobile devices, creating an instance of an interworking overhead message protocol for a mobile device that is in communication with the wireless communication system via the first RAT, operating the instance to switch from an inactive state to a tunnel active state in response to a signaling message associated with the second RAT and the mobile device, and causing a transmission, over a unicast channel of the first RAT, of one or more overhead messages via a communication tunnel to the mobile device to cause the mobile device to communicate with the second RAT. The one or more overhead messages can be associated with the second RAT. The first and second RATs can be based on different radio access technologies. Other implementations can include corresponding systems, apparatus, and computer programs, configured to perform the actions of the techniques, encoded on computer readable mediums.

In yet another aspect, interworking techniques can include creating an instance of an overhead message protocol for a wireless sector of a wireless communication system; and using the instance to broadcast communication messages over a control channel of a first RAT to inform mobile devices about a second RAT. The first and second RATs can be based on different radio access technologies. Using the instance to broadcast communication messages can include broadcasting system parameters. Using the instance to broadcast communication messages can include broadcasting quick configuration parameters. In some implementations, the first RAT is based on a High Rate Packet Data (HRPD) radio access technology. Using the instance to broadcast communication messages can include broadcasting neighbor list information associated with the second RAT. Other implementations can include corresponding systems, apparatus, and computer programs, configured to perform the actions of the techniques, encoded on computer readable mediums.

In another aspect, wireless communication systems can include wireless communication modules based on multiple radio access technologies (RATs) to provide wireless coverage to multiple mobile devices and a network that is communicatively couple with the wireless communication modules. The network can be configured to create an instance of an interworking overhead message protocol, includes an inactive state and a tunnel active state, for a mobile device that is in communication with the wireless communication system via the first RAT. The network can be configured to operate the instance to switch from the inactive state to the tunnel active state in response to a signaling message associated with the second RAT and the mobile device. The network can be configured to cause a transmission, over a unicast channel of the first RAT, of one or more overhead messages via a communication tunnel to the mobile device to cause the mobile device to communicate with the second RAT. The one or more overhead messages can be associated with the second RAT.

In another aspect, wireless communication systems can include wireless communication modules based on multiple radio access technologies (RATs) to provide wireless coverage to multiple mobile devices. Systems can include a circuitry module to provide an enhanced overhead message protocol (OMP) instance in a wireless sector to broadcast communication messages, a circuitry module to provide an enhanced inter-RAT OMP for a mobile device in response to a connection request from the mobile device associated with a first RAT, a circuitry module to operate the enhanced inter-RAT OMP to switch to a tunnel active state in response to a request from the mobile device associated with a second RAT, and a circuitry module to use the enhanced inter-RAT OMP to send overhead messages via a communication tunnel to the mobile device.

In another aspect, interworking techniques can include communicating with a wireless communication system via a first radio access technology (RAT) to receive, over a unicast channel of the first RAT, one or more overhead messages via a communication tunnel that is associated an interworking overhead message protocol, using the one or more overhead messages to operate a protocol stack associated with the second RAT; and communicating, based on the protocol stack, with the wireless communication system via the second RAT. The one or more overhead messages can be associated with a second RAT of the wireless communication system. In some implementations, a communication tunnel is associated with an instance of the interworking overhead message protocol created for a single mobile device. In some implementations, the wireless communication system operates the instance to switch from an inactive state to a tunnel active state in response to a signaling message associated with the second RAT and the mobile device. Other implementations can include corresponding systems, apparatus, and computer programs, configured to perform the actions of the techniques, encoded on computer readable mediums.

In another aspect, wireless communication systems and apparatuses can include transceiver circuitry to communicate with a wireless communication system via multiple radio access technologies and processor electronics. A wireless communication system can include a first RAT and a second RAT. In some implementations, processor electronics are configured to communicate with the wireless communication system via the first RAT to receive, over a unicast channel of the first RAT, one or more overhead messages via a communication tunnel that is associated an interworking overhead message protocol, the one or more overhead messages being associated with a second RAT of the wireless communication system, use the one or more overhead messages to operate a protocol stack associated with the second RAT, and communicate, based on the protocol stack, with the wireless communication system via the second RAT.

The details of one or more implementations are set forth in the accompanying attachments, the drawings, and the description below. Other features will be apparent from the description and drawings, and from the claims.

DETAILED DESCRIPTION

Forth generation (4G) wireless technologies such as LTE and WiMAX can provide very high throughput for data applications, more efficient use of radio spectrum, and less latency to improve mobility. 4G wireless technologies can provide an ecosystem to the mobile wireless industry and benefit mobile operators, infrastructure manufacturers, mobile device vendors, and end users. 4G based radio access networks can include Orthogonal Frequency Division Multiplexing (OFDM) and Multiple-In-Multiple-Out (MIMO) technologies. In the core networks, 4G wireless technology can employ a flat network architecture to simplify the network design, implementation, and deployment.

Upgrading to a 4G wireless technology may require extensive changes to a wireless operator's radio access network equipment and core network. Wireless operators may gradually transition from one generation to the next generation of wireless technologies. For example, it is possible that two or three different generations of wireless networks can co-exists over a long period of time, e.g., a decade. As a result, developing interworking techniques and mechanisms amongst different wireless technologies may become vital for the long term success of mobile operators and manufacturers. With interworking techniques and mechanisms, wireless operators can efficiently migrate from one generation to the next.

In an interworking wireless technology architecture, a wireless communication system can include a core network for different radio access networks. A radio access network can include one or more base stations that are based on different technologies to provide wireless services to mobile devices such as a single mode mobile device or a multi-mode mobile device. A single mode mobile device includes equipment for a single radio access technology (RAT), whereas a multi-mode mobile device includes equipment for two or more radio access technologies.

Figure 1:
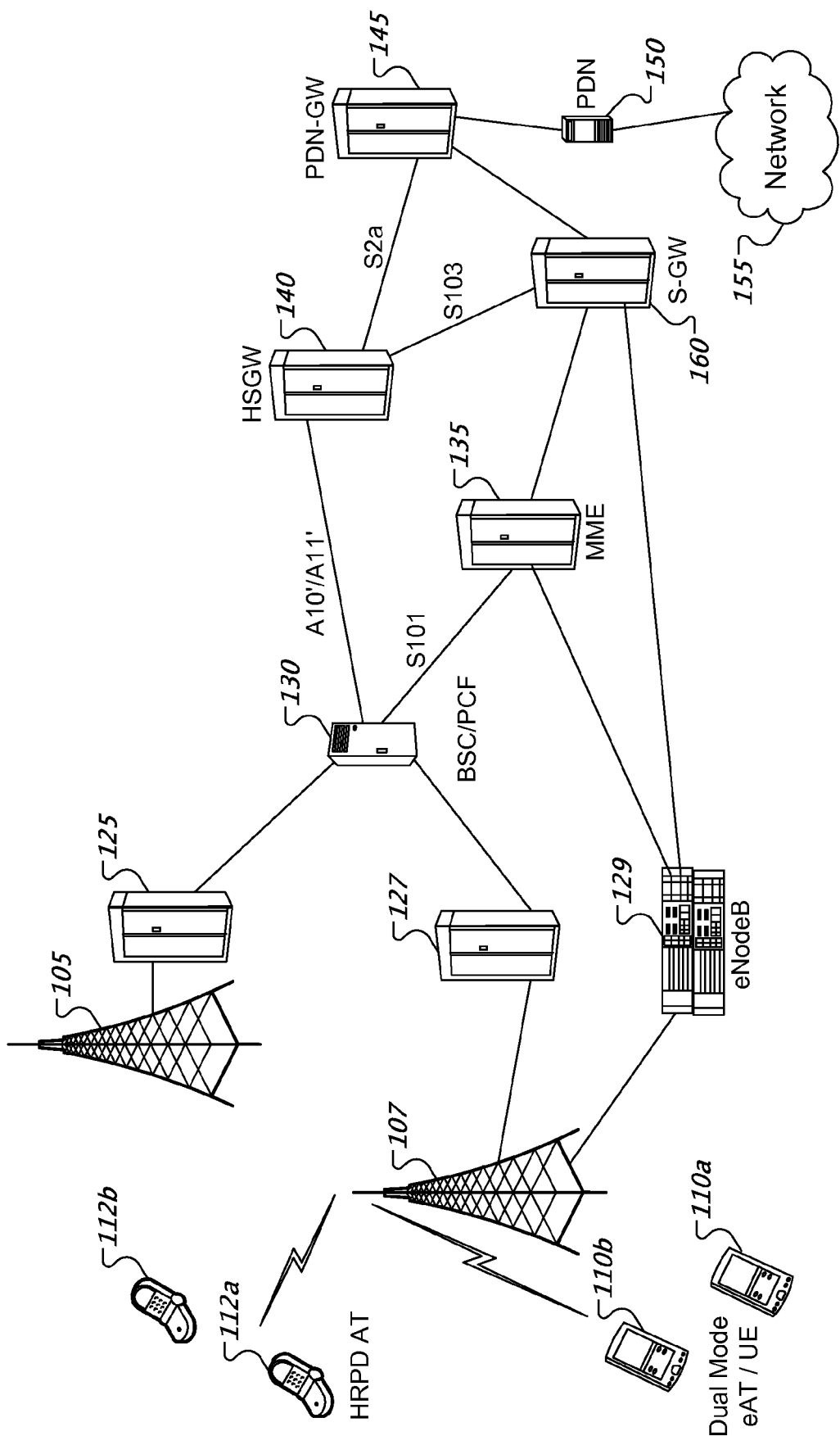
FIG. 1 shows an example of a wireless communication system that includes internetworking mechanisms.

FIG. 1 shows an example of a wireless communication system that includes internetworking mechanisms. A wireless communication system can include one or more base stations (BSs) 105, 107 to provide wireless service to one or more mobile devices 110*a*, 110*b*, 112*a*, 112*b*. A base station 105, 107 can include a wireless communication module for a radio access technology. In some implementations, a base station can include two or more wireless communication modules for two or more radio access technologies. In some implementations, a base station 105, 107 can transmit and receives signals in two or more wireless sectors.

A base station 105, 107 can transmit a signal on a forward link (FL), called a downlink (DL), to one or more mobile devices 110*a*, 110*b*, 112*a*, 112*b*. A mobile device 110*a*, 110*b*, 112*a*, 112*b* can transmit a signal on a reverse link (RL), called an uplink (UL), to a base station 105, 107. Mobile devices such as multi-mode mobile devices 110*a*, 110*b*, e.g., dual mode eAT/UEs, can communicate via two or more radio access technologies.

Radio access networks 125, 127, 129 can communicate with base stations 105, 107. In some implementations, radio access networks 125, 127, 129 include one or more base stations 105, 107. Access networks 125, 127 can communicate with a Base Station Controller (BSC) 130. The BSC 130 can implement a Packet Control Function (PCF). A radio access network such as an eNodeB 129 can communicate with a multi-mode base station 107. A multi-mode base station 107 can provide communications via two or more radio access technologies. In some implementations, a multi-mode base station 107 includes two or more base stations that are based on different radio access technologies. In some implementations, radio access network equipment can include multiple wireless communication modules that are respectively based multiple radio access technologies, e.g., LTE, WiMAX, eHRPD, and HRPD.

A core network can communicate the radio access networks 125, 127, 129. A core network can include a Mobility Management Entity (MME) 135, a HRPD Serving Gateway (HSGW) 140, a Packet Data Network (PDN) 150, a PDN Gateway (PDN-GW) 145, a Serving Gateway (S-GW) 160. A HSGW 140 can communicate with a PDN 150 via a PDN-GW 145. The PDN 150 can provide connectivity to a network 155 such as the Internet. A MME 135 can process control plane traffic for one or more radio access networks 125, 127, 129.

As an example of interworking between LTE and HRPD technologies, a wireless communication system can include an HRPD access network that is upgraded to be an evolved HRPD (eHRPD) access network. An eHRPD access network can support different types of mobile devices such as HRPD based legacy ATs and HRPD based evolved ATs. The wireless communication system can include an eNodeB to provide LTE radio connections to LTE based mobile devices. Radio access networks such as an eHRPD access network and an eNodeB can be connected to a common core network through a packet network gateway. In some implementations, an eHRPD access network can connect to a common core network through a HSGW for user plane traffic and through a MME for control plane traffic. An eNodeB can connect to a common core network through a S-GW for user plane traffic and a MME for control plane traffic.

Figure 2:
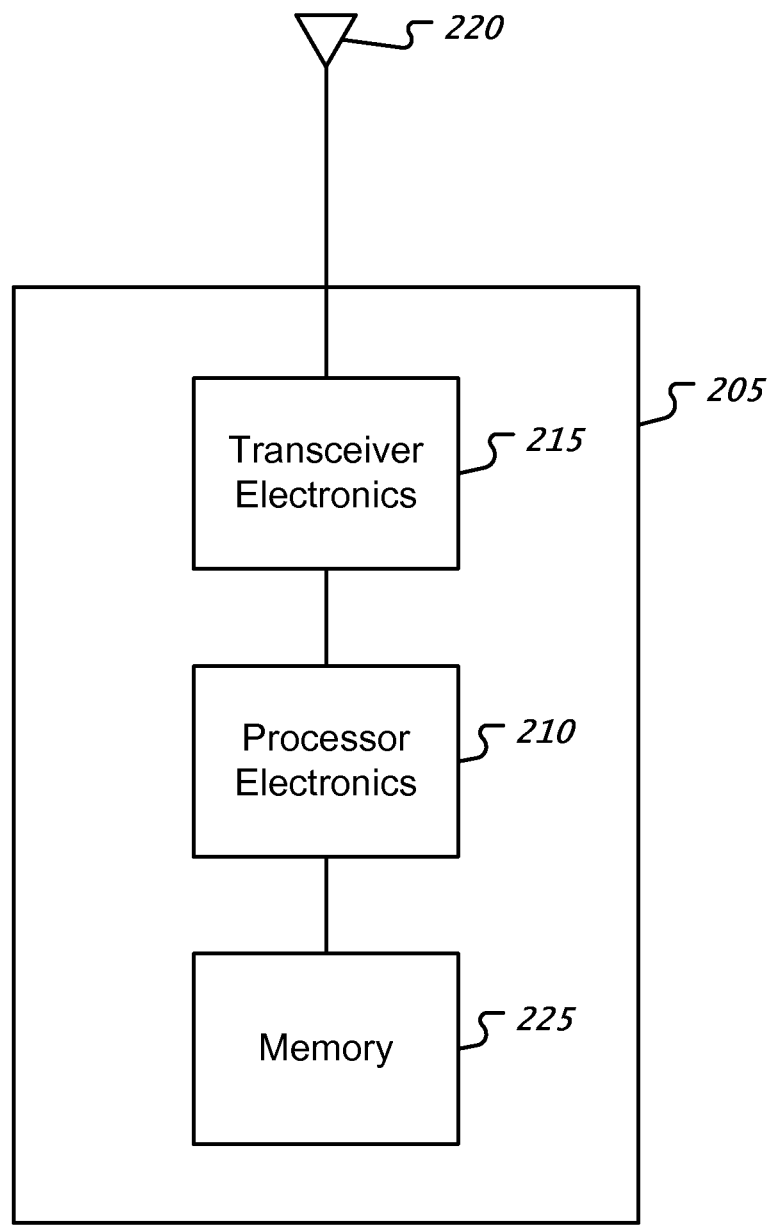
FIG. 2 shows an example of a radio station architecture.

FIG. 2 shows an example of a radio station architecture. Various examples of radio stations include base stations and mobile devices. A radio station 205 such as a base station or a mobile device can include processor electronics 210 such as a microprocessor that implements methods such as one or more of the techniques presented in this document. A radio station 205 can include transceiver electronics 215 to send and/or receive wireless signals over one or more communication interfaces such as one or more antennas 220. A radio station 205 can include other communication interfaces for transmitting and receiving data. In some implementations, a radio station 205 can include one or more wired communication interfaces to communicate with a wired network. A radio station 205 can include one or more memories 225 configured to store information such as data and/or instructions. In some implementations, processor electronics 210 can include at least a portion of transceiver electronics 215 and a memory 225.

In a co-existing 3G and 4G network deployment scenario, such as 3G HRPD network and 4G LTE or WiMAX network, multiple wireless technologies may cover the same geographic area and provide wireless services to a single-mode mobile devices, e.g., a legacy mobile stations, or multi-mode mobile devices, e.g., dual mode eAT/UEs. For example, a wireless network such as 3G HRPD can be evolved to support single-mode mobile devices and multi-mode mobile devices.

A wireless communication system can provide wireless services over multiple radio access technologies such as LTE and eHRPD. When a multi-mode mobile device is attached to a LTE network and will be transitioning out of a LTE coverage area but still in an eHRPD coverage area, the LTE network can initiate an optimized handover via pre-registration with the eHRPD network over LTE tunneling. Pre-registration with the eHRPD network can reduce the handoff latency and provide a seamless data service handoff experience to the user of a multi-mode mobile device.

An interworking handoff can include providing system information about the eHRPD network when the multi-mode mobile device is still attached to the LTE network. An interworking architecture can include one or more mechanisms to provide system information to a multi-mode mobile device. For example, in a LTE broadcast control channel, an eNodeB can broadcast a system information block (SIB), e.g., SIB-8, to provide neighboring eHRPD network system information such as an eHRPD band class, channel frequency, or search window size. When a multi-mode mobile device receives a SIB from the eNodeB, the multi-mode mobile device can pass the SIB to an eHRPD protocol stack. Based on the SIB, the multi-mode mobile device can allocate a measurement slot to search for eHRPD radio signals. In another example, an eHRPD access network can use a LTE tunnel including S101, S1-MME (e.g., between a MME and an eNodeB) and a LTE airlink to send system information of an eHRPD network to a multi-mode mobile device in a unicast manner. In another example, when a multi-mode mobile device is attached to an eHRPD network and will handoff to an E-UTRAN or WiMAX network, an interworking handoff can require that the eHRPD access network transmit non-HRPD neighbor cell and sectors information to the multi-mode mobile device.

This document describes techniques, apparatuses, and systems to interwork multiple wireless technologies to provide wireless services to mobile devices. This document includes descriptions of overhead message protocol (OMP) techniques that address multiple radio access technologies (RATs). This document includes descriptions of enhanced OMP and enhanced Inter-RAT OMP technologies.

Interwork techniques can include provide an OMP instance in a wireless sector to broadcast communication messages. Interwork techniques can include providing an enhanced inter-RAT OMP instance for a mobile device that is in communication with the wireless communication system via the first RAT. Interwork techniques can include transmitting, over a unicast channel of the first RAT, an overhead message that is associated with the second RAT to the mobile device.

In some implementations, interworking techniques include instantiating a single InUse instance of a OMP, such as a legacy or an enhanced OMP, per sector and multiple InUse instances of an enhanced Inter-RAT OMP for respective multiple multi-mode mobile devices attaching to an access network. For example, an eHRPD access network can use interworking techniques to support both legacy ATs and evolved ATs in the eHRPD. The eHRPD access network can use interworking techniques to optimize handoffs when multi-mode mobile devices are connecting to a network of a different radio access technology. In some implementations, an eHRPD network can provide information of non-HRPD neighboring cells for an optimized handoff from the eHRPD network to non-HRPD networks. The wireless inter-radio access technology interworking technologies described herein can be implemented by various combinations of different radio access technologies, e.g., interworking between LTE and HRPD, WiMAX and HRPD, 3GPP2 CDMA2000 1x and HRPD, 3GPP UMTS and LTE, HRPD and E-UTRAN, and HRPD and WiMAX.

Figure 3A:
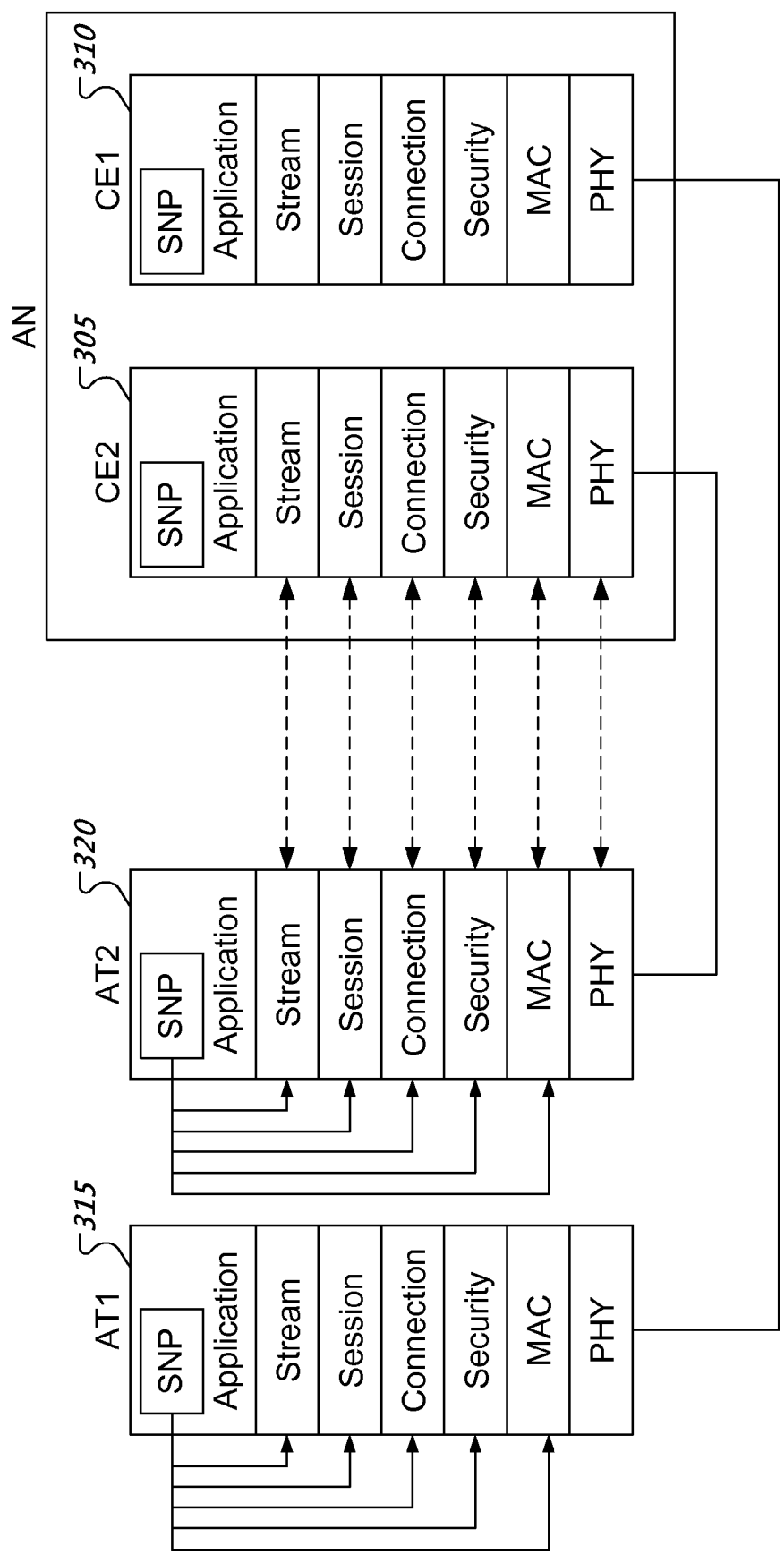
FIG. 3A shows an example of communications pathways between wireless network protocol stacks.

FIG. 3A shows an example of communications pathways between wireless network protocol stacks. A wireless network protocol stack such as a HRPD protocol stack can include an Application Layer, Stream Layer, Session Control Layer, Connection Layer, Security Layer, MAC Layer, and a PHY Layer. Each layer can be associated with one or more protocols.

Based on an initialization, a mobile device can create a protocol instance of a HRPD protocol stack to communicate with an access network. The access network can create a protocol instance of the HRPD protocol stack to interface with the protocol instance on the mobile device. In some implementations, when a mobile device is connecting to an access network, the access network can dynamically create an instance of the protocol stack for that mobile device. An access network can operate multiple protocol stack instances 305, 310 that correspond respectively to protocol stack instances 315, 320 on multiple mobile devices, e.g., AT1 and AT2.

In a data plane, an upper layer protocol can send application data to a HRPD application layer such as a Radio Link Protocol (RLP). A RLP can encapsulate application data with a RLP header. The RLP can pass encapsulated application data to a stream layer. After processing an input payload, each layer can attach a layer specific header. A layer can send an output to the next layer protocol for processing.

In a control plane, a Signaling Network Protocol (SNP) in an application layer can route HRPD messages. SNP can provide a routing capability for one or more protocols. When a packet is delivered to SNP, SNP can check the packet's Message ID to decide which protocol can receive the packet.

Figure 3B:
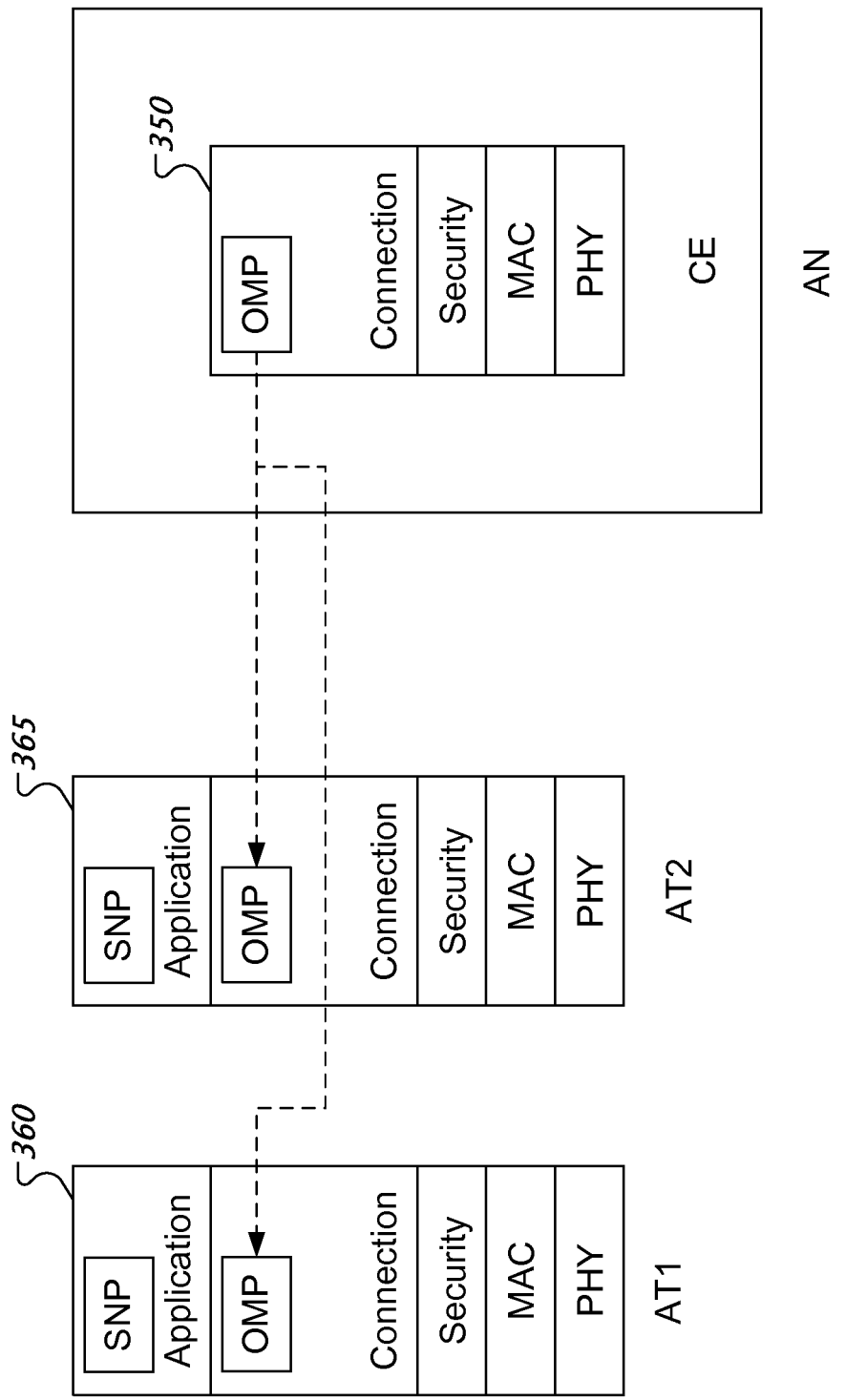
FIG. 3B shows an example of communications pathways between Overhead Message Protocol (OMP) stacks.

FIG. 3B shows an example of communications pathways between Overhead Message Protocol (OMP) stacks. A OMP stack, such as a HRPD OMP stack, includes an Application Layer, Connection Layer, Security Layer, MAC Layer, and a PHY Layer. An access network can operate a single OMP instance 350 for a wireless sector to communicate with OMP instances 360, 365 on multiple mobile devices, e.g., AT1 and AT2, in the wireless sector. In some implementations, the AN instantiates a single InUse instance of the OMP per wireless sector. An OMP state machine at the AN can include an active state. An OMP state machine at a mobile device can include an inactive state and an active state.

After an OMP is instantiated at the access network, the access network can cause the OMP instance to enter an active state. In the active state, an access network can periodically broadcast OMP messages such as QuickConfig and SectorParameters messages over a Control Channel. An access network can include a QuickConfig message in every Control Channel synchronous Sleep State capsule. In some implementations, an access network includes a SectorParameters message in a synchronous capsule at least once every $N_{OMPSectorParameters}$ Control Channel cycles. In some implementations, $N_{OMPSectorParameters}$ is a operator configurable parameter.

A mobile device can initialize its OMP state machine to the inactive state. The mobile device's state machine can enter the active state based on receiving an activate command from a protocol. In the active state, the mobile device can periodically monitor for OMP messages.

Figure 4:
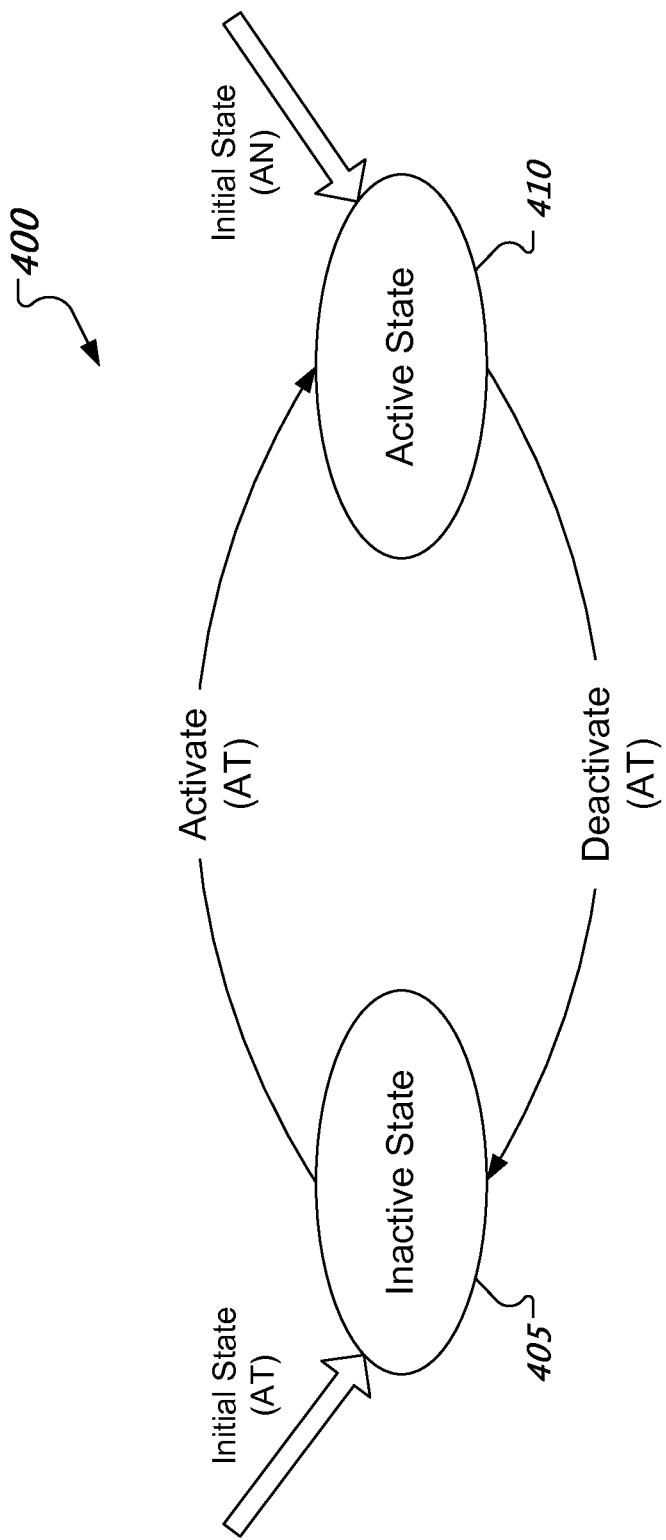
FIG. 4 shows an example of an OMP state transition diagram.

FIG. 4 shows an example of an OMP state transition diagram. An OMP state machine 400 includes an inactive state 405 and an active state 410. An access terminal can initialize its OMP state machine to the inactive state 405. The access terminal's state machine can enter the active state 410 based on receiving an activate command from a protocol. In the active state 410, the access terminal can periodically monitor for OMP messages.

Figure 5:
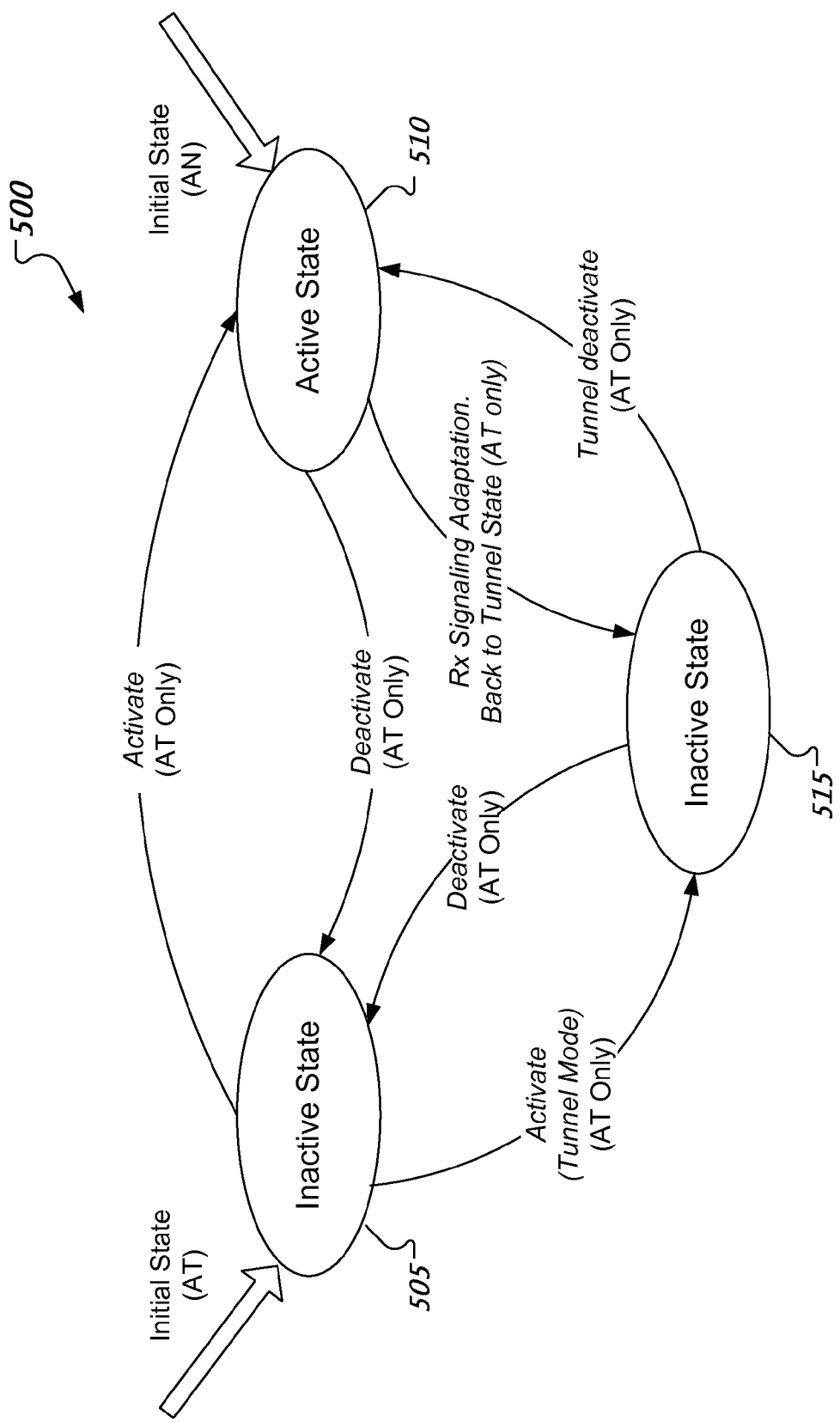
FIG. 5 shows an example of an internetwork OMP state transition diagram.

FIG. 5 shows an example of an internetwork OMP state transition diagram. An internetwork OMP state machine such as an Inter-RAT OMP state machine 500 includes an inactive state 505, an active state 510, and a tunnel active state 515. The tunnel active state 515 is associated with multi-mode mobile devices. During a boot-up, a multi-mode mobile device can enter the inactive state 505 based on a detection of a radio access technology. For example, a multi-mode mobile device can enter the inactive state 505 if a primary radio technology is not HRPD.

When a multi-mode mobile device receives an activate command that indicates a tunnel mode, e.g., Tunnel Mode Enabled is set to one, then the multi-mode mobile device can enter the tunnel active state 515. In the tunnel active state 515, the multi-mode mobile device can receive eHRPD overhead parameters over a tunnel from an eAN for a tunnel mode operation. Based on an activate command, the multi-mode mobile device can enter a HRPD mode. The multi-mode mobile device attaching to an eHRPD network can receive an overhead message over an eHRPD Control Channel directly.

At an access network, an inter-RAT OMP state machine includes active state. The access network can initialize its inter-RAT OMP state machine to the active state. An eHRPD AN can use one or more techniques to send system information such as broadcasting an overhead message over a control channel or sending an overhead message through a S101 tunnel. An Inter-RAT OMP can include one or more messages such as HRPD Silence Parameters for supporting active handoff between two radio access technologies. An eAN can transmit a HRPD Silence Parameters via unicast channel to a multi-mode mobile device over a tunnel.

Some previous OMP implementations may present issues for the access network. not be able to initialize an eAN to support both legacy ATs and evolved ATs under eHRPD networks. For example, such OMP implementations may conflict with the principle of legacy OMP instantiation. In some cases, a legacy OMP implementation is instantiated per sector basis, where a sector has only one InUse instance of OMP. In the Inter-RAT OMP, if there is only one InUse instance of an Inter-RAT OMP per sector that replaces the legacy OMP, this instance may broadcast QuickConfig and SystemParameter messages to multiple access terminals. However, this instance of an Inter-RAT OMP in an eAN may not be able to send unicast HRPD Silence Parameters message to a particular eAT over a tunnel because the instance may not carry specific mobile device information such as an address of the device. If an eAN instantiates one InUse instance of an Inter-RAT OMP for each eAT, then the eAN may need to perform the function as the legacy OMP to periodically send messages such as QuickConfig and SectorParameters messages. However, broadcasting QuickConfig and SectorParameter messages from all the instances of Inter-RAT OMP may cause control channel flooding. Some previous OMP implementations may lack a capability to deactivate an Inter-RAT OMP instance after an eAT is handed off from a non-HRPD to eHRPD network. Some previous OMP implementations may lack a capability in Inter-RAT OMP for other protocols to trigger transmission of interworking messages on a per mobile device basis.

Particular implementations of the subject matter described in this document can be implemented to realize one or more of the following potential advantages. Enhanced overhead messaging techniques can increase mobile device coordination between multiple radio access technology. Enhanced overhead messaging techniques can increase access network efficiency. Enhanced overhead messaging techniques can decrease internetwork handoff latency. Enhanced overhead messaging techniques can reduce traffic on access network control channels.

Interworking technique can include operating wireless communication modules based on multiple RATs to provide wireless coverage to multiple mobile devices. The technique can include providing an enhanced OMP instance in a wireless sector to broadcast communication messages. The technique can include providing an enhanced inter-RAT OMP for a mobile device in response to a connection request from the mobile device associated with a first RAT. The enhanced inter-RAT OMP can include an inactive state and a tunnel active state. The technique can include operating the enhanced inter-RAT OMP to switch to the tunnel active state in response to a request from the mobile device associated with a second RAT. The technique can include using the enhanced inter-RAT OMP to send overhead messages via a communication tunnel to the mobile device.

In some implementations, an evolved access network (eAN) can instantiate an enhanced OMP instance for one or more wireless sectors that are controlled the eAN. Based on the enhanced OMP instance, the eAN can periodically broadcast QuickConfig and SectorParameter message over a control channel, such as a HRPD control channel, to provide information about the network to mobile devices under eHRPD networks. When mobile devices, such as single-mode legacy mobile devices or multi-mode evolved mobile devices, are attaching to an eHRPD access network, the devices can receive system information broadcasts from an eHRPD access network over a control channel. In this way, an eHRPD access network can simultaneously support legacy and evolved types of mobile devices so that they can connect to the network.

An eHRPD access network can support bi-directional interworking handoffs, e.g., from a non-HRPD network to eHRPD network handoff and from an eHRPD network to a non-HRPD network handoff. An eHRPD access network can use an enhanced OMP to handle bi-directional interworking handoffs. Based on an instantiation and initialization of enhanced OMP, an eHRPD access network can create a single enhanced OMP instance for one or more wireless sectors. Enhanced OMP can include messages to carry neighbor information about one or more neighboring networks such a HRPD network, E-UTRAN network, or a WiMAX network.

In some implementations, an eHRPD access network can use an enhanced OMP to carry neighbor information about non-NRPD networks. For example, an eHRPD access network can periodically broadcast sector information about a non-HRPD network in a message such as a SectorParameter message or an Inter-RAT Neighbor List message. Table 1 shows an example of an enhanced OMP message format to carry information about one or more non-HRPD neighboring cells.

TABLE 1

Enhanced Overhead Message Protocol

| Field | Length (bits) |
|---|---|
| MessageID | 8 |
| ... | |
| Non-HRPD-NeighborCount | 4 |
| Non-HRPD-NeighborCount occurrences of the following fields { | |
| Non-HRPD-NeighborType | 4 |
| Non-HRPD-NeighborSignature | 16 |
| Non-HRPD-NeighborRecordLength | 8 |
| Non-HRPD-NeighborRecord | Non-HRPDNeighborRecordLength x 8 |
| } | |
| Reserved | 0-7 (as needed) |

An eHRPD access network can generate a message based on the format given by Table 1. Such a message can include one or more of records that include information about non-HRPD neighboring sectors. The access network can set the Non-HRPD-NeighborCount field to indicate the number of records included in the message. In some implementations, the access network can set the Non-HRPD-NeighborType field to "1" if the neighbor network is E-UTRAN, or "2" if the neighbor network is WiMAX. Other values for the Non-HRPD-NeighborType field can be reserved. The access network can change the Non-HRPD-NeighborSignature field if the contents of the Non-HRPD-Neighbor records change. The Non-HRPD-NeighborRecordLength field can be set with the length, in bytes, of the neighbor list information for a non-HRPD neighbor. The Non-HRPD-NeighborRecord field can be set to the neighbor information record for the non-HRPD neighbor cells.

When a multi-mode mobile device is attaching to eHRPD access network, the device can receive information such as non-HRPD neighbor cell information and HRPD system information over a control channel of the eHRPD access network. The mobile device can pass such information to a protocol processor such as an E-UTRAN or a WiMAX protocol processor for decoding. In some implementations, the Non-HRPD-NeighborType field is used to select a protocol processor based on a radio access technology type. Based on processing the non-HRPD neighbor network sector information, a multi-mode mobile device can send an encapsulated message such as one based on a pilot measurement report or a handoff request message through an eHRPD signaling tunnel. The eHRPD access network can send an encapsulated message to a MME over a S101 tunnel. An eHRPD access network can instantiate one InUse Instance of enhanced Inter-RAT OMP for each multi-mode mobile device attaching to the HRPD network over the non-HRPD network.

Figure 6:
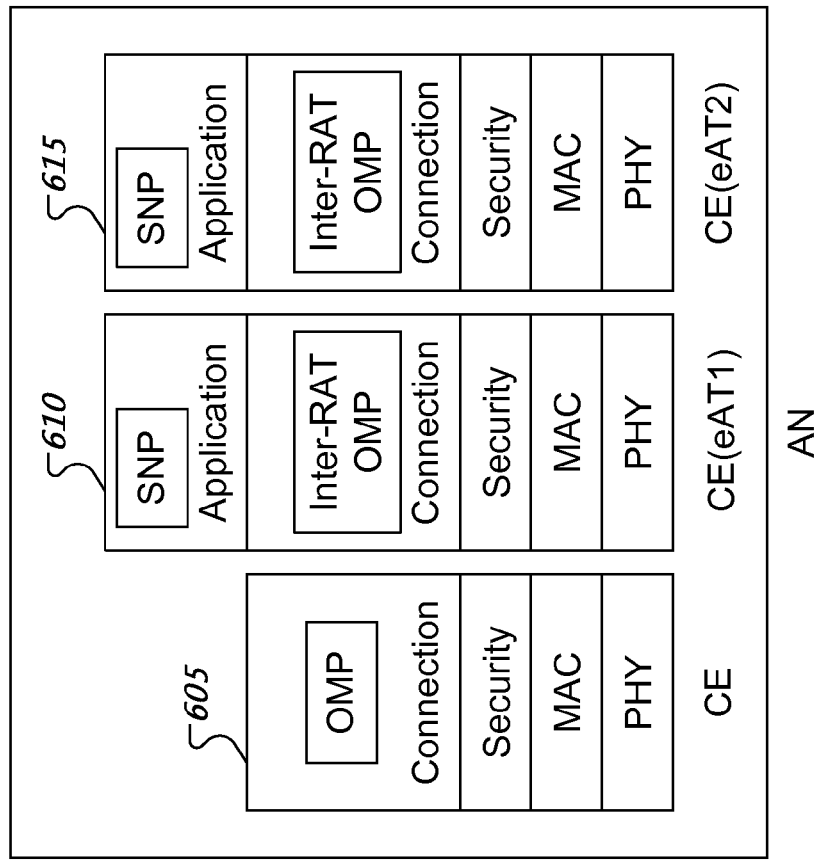
FIG. 6 shows an example of enhanced OMP and enhanced internetwork OMP instantiations.
Figure 6:
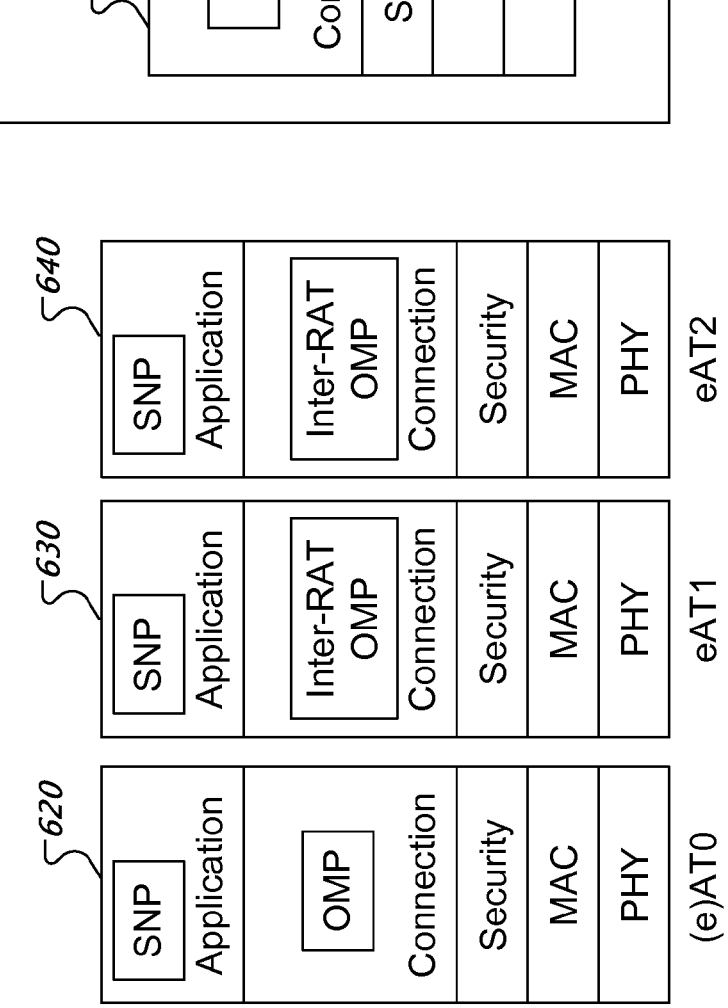

FIG. 6 shows an example of enhanced OMP and enhanced internetwork OMP instantiations. An access network creates an enhance OMP instance 605 for a wireless sector. The an OMP instance such as an enhanced OMP instance 605 can provide system information such as sector parameter information, quick configuration information, and non-HRPD neighbor list information to a mobile device, such as an AT or an evolved AT, attaching to the eHRPD network. An OMP instance at an AT can listen to the system information that is broadcasted via the enhanced OMP. Similarly, an enhanced OMP instance at an evolved AT can listen to the system information that is broadcasted via the enhanced OMP. An access network creates multiple enhanced internetwork OMP instances. In this example, the access network creates an Inter-RAT OMP instance such as an enhanced Inter-RAT OMP instance 610, 615 for each multi-mode mobile device that is attached. Each enhanced Inter-RAT OMP instance 610, 615 can communicate with respective wireless technology protocol stacks 630, 640 on respective multi-mode mobile devices. The enhanced OMP instance 605 can communicate with a mobile device with a legacy protocol stack 620.

In some implementations, an eHRPD access network can instantiate an InUse instance of an enhanced Inter-RAT OMP for each eAT attaching to the network. An InUse instance of an enhanced Inter-RAT OMP can be used for transmitting information such as system information over a tunnel associated with a non-HRPD network.

Figure 7:
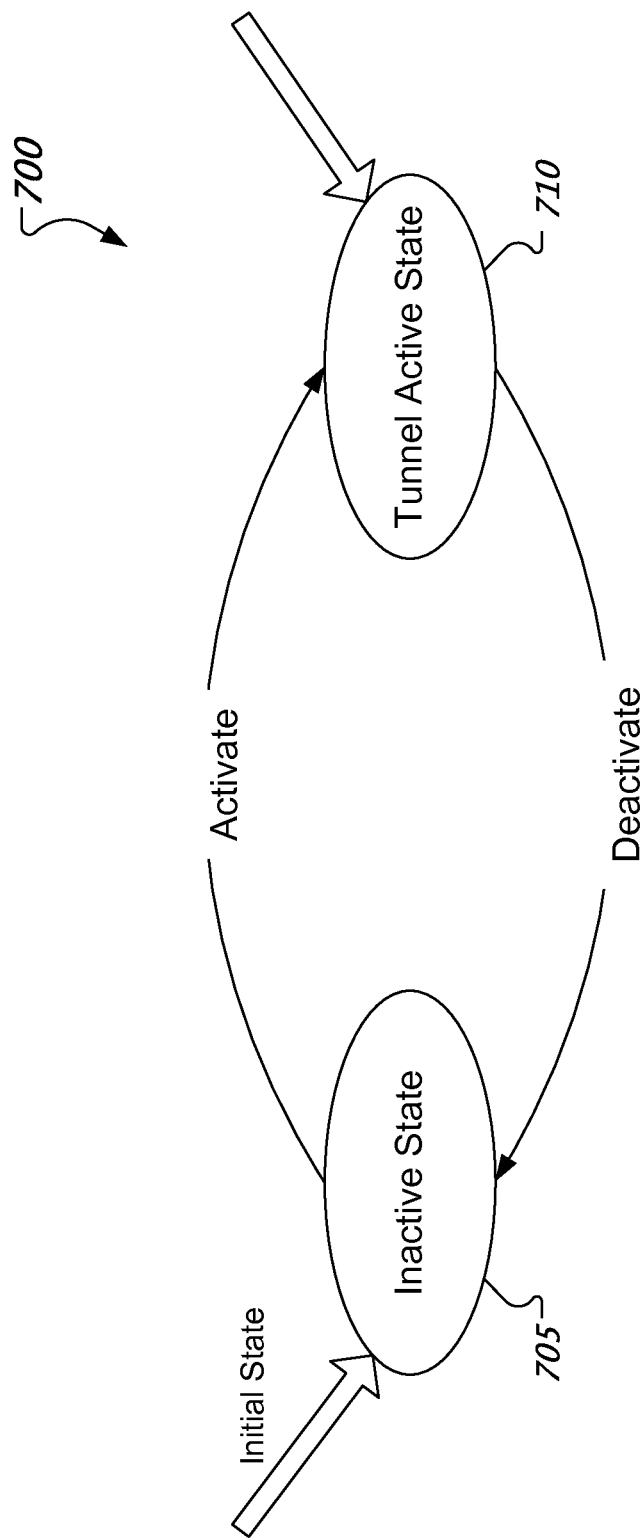
FIG. 7 shows an example of an enhanced internetwork OMP state transition diagram.

FIG. 7 shows an example of an enhanced internetwork OMP state transition diagram. An enhanced internetwork OMP state machine such as an enhanced Inter-RAT OMP state machine 700 includes an inactive state 705 and a tunnel active state 710. Upon receiving a connection request from an multi-mode mobile device, an evolved access network can dynamically or statically create an InUse instance of an enhanced Inter-RAT OMP for that multi-mode mobile device. The mobile device can initialized an instance of an enhanced Inter-RAT OMP to the inactive State 705. Based on receiving an activate command from a protocol, the InUse instance of the enhanced Inter-RAT OMP can enter the tunnel active state 710.

An Inter-RAT Signaling Adaptation Protocol (SAP) is a per mobile device based protocol. In some implementations, each multi-mode mobile device attaching to an eHRPD access network will have one InUse instance of the Inter-RAT SAP. The Inter-RAT SAP can issue an activate command to cause an Inter-RAT OMP instance to enter the tunnel active state 710 after its initialization. The Inter-RAT SAP can issue a de-activate command to cause an enhanced Inter-RAT OMP instance to enter the inactive state 705 when it falls back to a default Inter-RAT SAP mode.

In some implementations, an enhance Inter-RAT OMP instance at an eHRPD access network is not required to broadcast messages such as a QuickConfig message, Sector-Parameter message, or an Inter-RAT Neighbor List message. Instead, the eHRPD access network can use the enhance Inter-RAT OMP instance to send system information to a multi-mode mobile device over a tunnel in an unicast channel.

A network can provide a command interface for a protocol to trigger system information to be sent over a tunnel. In some implementations, a command interface can provide a SendHRPDParasOverTunnel command. Using a SendHRPDParasOverTunnel command, protocols such as an Inter-RAT SAP can initiate the transmission of system information, e.g., HRPDSilenceParas, SectorParameters or QuickConfig, to a peer protocol via an enhanced Inter-RAT OMP on the multi-mode mobile device over a tunnel during an event such as a pre-registration or an active handoff.

Figure 8:
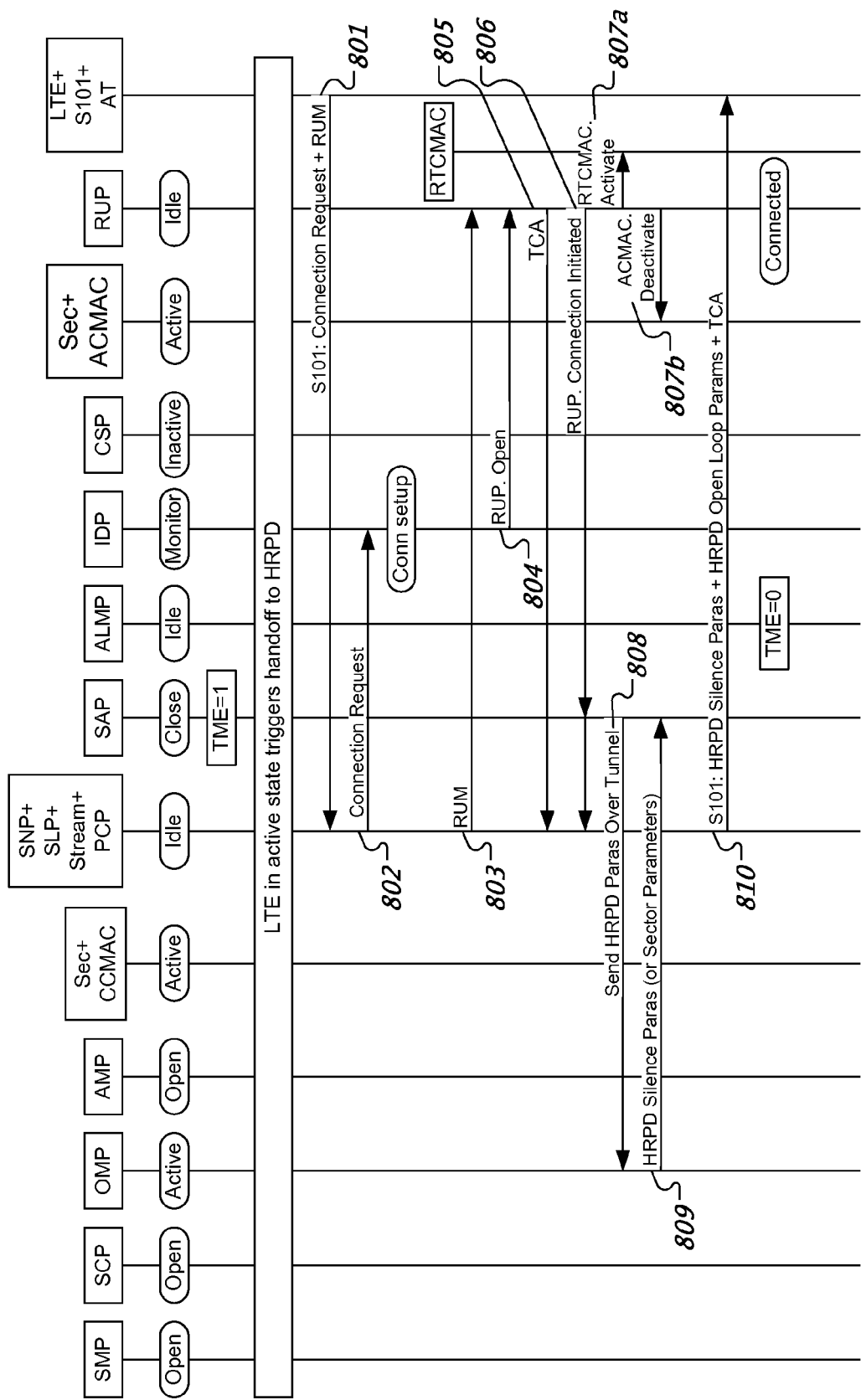
FIG. 8 shows an example of a timing diagram associated with an internetwork handoff.

FIG. 8 shows an example of a timing diagram associated with an internetwork handoff. A wireless communication system can perform an inter-network handoff such as a handoff from a LTE access network to an eHRPD access network. Performing an inter-network handoff can include using a command to send network parameters of a target access network over a communication tunnel.

At 801, an access network, which is in a tunnel mode (indicated by the TME=1 box), receives information such as a Connection Request (CR) and a Route Update Message (RUM) from a multi-mode mobile device over a S101 tunnel, the network can route the CR and RUM to an internal Signaling Network Protocol (SNP).

At 802, the SNP forwards the CR to an Idle State Protocol (IDP). The CR can trigger the IDP to enter a connection setup state.

At 803, the SNP routes the RUM to a Route Update Protocol (RUP).

At 804, based on the CR, the IDP sends an Open command to the RUP.

At 805, the RUP sends a Traffic Channel Assignment (TCA) message to the SNP. The SNP can buffer the TCA message.

At 806, based on the TCA message, the RUP sends an Inter-RAT SAP message with a Connection Initiated indication.

At 807a, the RUP can activate a reverse traffic channel MAC (RTCMAC) mechanism to start reverse link detection.

At 807b, the RUP can de-active an access channel MAC (ACMAC) mechanism.

At 808, based on the Connection Initiated indication, the Inter-RAT SAP sends a SendHRPDParasOverTunnel command to the enhanced Inter-RAT OMP. The SendHRPDParasOverTunnel command triggers the enhanced Inter-RAT OMP to send system messages such as HRPDSilenceParas or SectorParameters messages.

At 809, the enhanced Inter-RAT OMP sends one or more system messages to the SNP. The SNP can buffer system messages.

At 810, upon activation, the RTCMAC sends a HRPDOpenLoopParams message to the SNP. The SNP can buffer the HRPDOpenLoopParams message.

At 811, the SNP sends a buffered messages, e.g., HRPDSilenceParas message, TCA, and HRPDOpenLoopParams, in one message to the multi-mode mobile device over a S101 tunnel. The multi-mode mobile device performs a traffic channel setup upon receiving these buffered messages.

Figure 9:
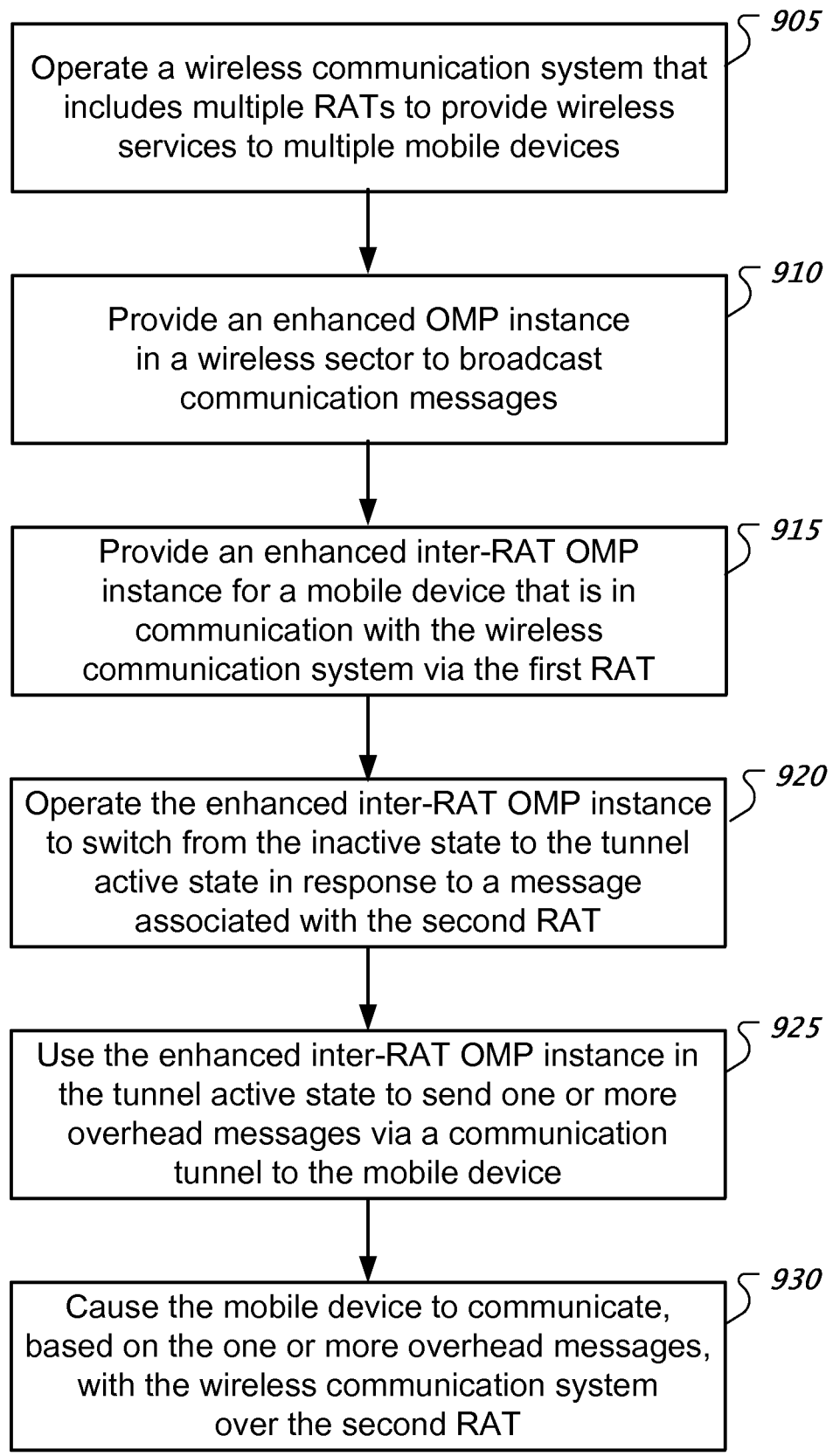
FIG. 9 shows an example of an interworking process.

FIG. 9 shows an example of an interworking process. At 905, an interworking process can operate a wireless communication system that includes multiple RATs to provide wireless services to multiple mobile devices. Operating a wireless communication system can include operating one or more access networks.

At 910, the process can provide an enhanced OMP instance in a wireless sector to broadcast communication messages. In some implementations, the process can broadcast communication messages that include information to assist a mobile device to receive signals from one or more neighboring networks.

At 915, the process can provide an enhanced inter-RAT OMP instance for a mobile device that is in communication with the wireless communication system via the first RAT. In some implementations, the process can create an enhanced inter-RAT OMP instance for each multi-mode mobile device that is in communication with the wireless communication system.

At 920, the process can operate the enhanced inter-RAT OMP instance to switch from the inactive state to the tunnel active state in response to a message associated with the second RAT. The enhanced inter-RAT OMP instance can include an inactive state and a tunnel active state. In some implementations, the process can operate the inter-RAT OMP instance to enter the tunnel active state based on an activate command. The process can operate the inter-RAT OMP instance to enter the inactive state based on a deactivate command. A message such as a signaling message can be associated with the second RAT and the mobile station. The signaling message can indicative a handoff between different radio access technologies.

At 925, the process can use the enhanced inter-RAT OMP instance in the tunnel active state to send one or more overhead messages via a communication tunnel to the mobile device. Using the enhanced inter-RAT OMP instance in the tunnel active state can include transmitting an overhead message that is associated with the second RAT to the mobile device. In some implementations, an overhead message can be transmitted over a unicast channel of the first RAT. In some implementations, an instance can include one or more protocol state values.

At 930, the process can cause the mobile device to communicate, based on the one or more overhead messages, with the wireless communication system over the second RAT. In some implementations, an overhead message can include one or more system parameters.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communications, comprising:
   operating a wireless communication system that includes multiple radio access technologies (RATs) to provide wireless services to multiple mobile devices, wherein the multiple RATs include a first RAT and a second RAT;
   providing an enhanced overhead message protocol (OMP) instance in a wireless sector to broadcast communication messages;
   providing an enhanced inter-RAT OMP instance for a mobile device that is in communication with the wireless communication system via the first RAT, wherein the enhanced inter-RAT OMP instance includes an inactive state and a tunnel active state;
   operating the enhanced inter-RAT OMP instance to switch from the inactive state to the tunnel active state in response to a message associated with the second RAT; and
   using the enhanced inter-RAT OMP instance in the tunnel active state to send one or more overhead messages via a communication tunnel to the mobile device.

2. The method of claim 1, wherein using the enhanced inter-RAT OMP instance in the tunnel active state comprises:
   transmitting, over a unicast channel of the first RAT, an overhead message that is associated with the second RAT to the mobile device.

3. The method of claim 1, further comprising:
   causing the inter-RAT OMP instance to enter the tunnel active state based on an activate command; and
   causing the inter-RAT OMP instance to enter the inactive state based on a deactivate command.

4. The method of claim 3, further comprising:
   causing an inter-RAT Signaling Adaptation Protocol (SAP) to send the activate command based on entering an open state; and
   causing the inter-RAT SAP to send the deactivate command based on entering a closed state.

5. The method of claim 1, further comprising:
   providing a command to trigger the inter-RAT OMP instance to send one or more system parameters to the mobile device, wherein the one or more system parameters are associated with the second RAT.

6. The method of claim 5, further comprising:
   transmitting the one or more system parameters over the communication tunnel in a unicast manner based on the command; and
   causing the mobile device to communicate, based on the one or more system parameters, with the wireless communication system over the second RAT.

7. The method of claim 1, further comprising:
   using the enhanced OMP instance to broadcast information over a control channel of the first RAT, wherein the broadcast information includes an inter-RAT neighbor list message.

8. The method of claim 7, wherein using the enhanced inter-RAT OMP instance in the tunnel active state comprises providing information of one or more neighboring wireless cells to the mobile device for a handoff from the first RAT to the second RAT.

9. A method for wireless communications, comprising:
   operating a wireless communication system that includes multiple radio access technologies (RATs) to provide wireless services to multiple mobile devices, wherein the multiple RATs include a first RAT and a second RAT;
   creating an instance of an interworking overhead message protocol for a mobile device that is in communication with the wireless communication system via the first RAT, wherein the interworking overhead message protocol includes an inactive state and a tunnel active state;
   operating the instance to switch from the inactive state to the tunnel active state in response to a signaling message associated with the second RAT and the mobile device; and
   causing a transmission, over a unicast channel of the first RAT, of one or more overhead messages via a communication tunnel to the mobile device to cause the mobile device to communicate with the second RAT, wherein the one or more overhead messages are associated with the second RAT.

10. The method of claim 9, further comprising:
    creating multiple instances of the interworking overhead message protocol for respective mobile devices that are in communication with the wireless communication system via the first RAT.

11. The method of claim 9, further comprising:
    causing the instance to enter the tunnel active state based on an activate command; and
    causing the instance to enter the inactive state based on a deactivate command.

12. The method of claim 11, further comprising:
    causing a signaling adaptation protocol to send the activate command based on entering an open state; and
    causing the signaling adaptation protocol to send the deactivate command based on entering a closed state.

13. The method of claim 9, further comprising:
    providing a command to trigger the instance to send one or more system parameters to the mobile device, wherein the one or more system parameters are associated with the second RAT.

14. The method of claim 9, wherein the first and second RATs are based on different radio access technologies.

15. A wireless communication system, comprising:
    wireless communication modules based on multiple radio access technologies (RATs) to provide wireless coverage to multiple mobile devices;

circuitry module to provide an enhanced overhead message protocol (OMP) instance in a wireless sector to broadcast communication messages;

circuitry module to provide an enhanced inter-RAT OMP for a mobile device in response to a connection request from the mobile device associated with a first RAT, wherein the enhanced inter-RAT OMP includes an inactive state and a tunnel active state;

circuitry module to operate the enhanced inter-RAT OMP to switch to the tunnel active state in response to a request from the mobile device associated with a second RAT; and circuitry module to use the enhanced inter-RAT OMP to send overhead messages via a communication tunnel to the mobile device.

16. The system of claim 15, further comprising:
circuitry module to transmit, over a unicast channel of the first RAT, an overhead message that is associated with the second RAT to the mobile device.

17. A wireless communication system, comprising:
wireless communication modules based on multiple radio access technologies (RATs) to provide wireless coverage to multiple mobile devices, wherein the multiple RATs include a first RAT and a second RAT; and
a network that is communicatively couple with the wireless communication modules, wherein the network is configured to (i) create an instance of an interworking overhead message protocol, which includes an inactive state and a tunnel active state, for a mobile device that is in communication with the wireless communication system via the first RAT, (ii) operate the instance to switch from the inactive state to the tunnel active state in response to a signaling message associated with the second RAT and the mobile device, and (iii) cause a transmission, over a unicast channel of the first RAT, of one or more overhead messages via a communication tunnel to the mobile device to cause the mobile device to communicate with the second RAT, wherein the one or more overhead messages are associated with the second RAT.

18. The system of claim 17, wherein the network is configured to create multiple instances of the interworking overhead message protocol for respective mobile devices that are in communication with the wireless communication system via the first RAT.

19. The system of claim 17, wherein the network is configured to cause the instance to enter the tunnel active state based on an activate command and cause the instance to enter the inactive state based on a deactivate command.

20. The system of claim 19, wherein the network is configured to cause a signaling adaptation protocol to send the activate command based on entering an open state, and cause the signaling adaptation protocol to send the deactivate command based on entering a closed state.

21. The system of claim 17, wherein the network is configured to provide a command to trigger the instance to send one or more system parameters to the mobile device, wherein the one or more system parameters are associated with the second RAT.

22. The system of claim 17, wherein the first and second RATs are based on different radio access technologies.

23. The system of claim 17, further comprising:
a multi-mode mobile device configured to communicate via the first and second RATs and to receive the one or more overhead messages.

24. A method for wireless communications, comprising:
communicating with a wireless communication system via a first radio access technology (RAT) to receive, over a unicast channel of the first RAT, one or more overhead messages via a communication tunnel that is associated an interworking overhead message protocol, wherein the one or more overhead messages are associated with a second RAT of the wireless communication system;
using the one or more overhead messages to operate a protocol stack associated with the second RAT; and
communicating, based on the protocol stack, with the wireless communication system via the second RAT,
wherein the communication tunnel is associated with an instance of the interworking overhead message protocol created for a single mobile device, wherein the wireless communication system operates the instance to switch from an inactive state to a tunnel active state in response to a signaling message associated with the second RAT and the mobile device.

25. The method of claim 24, further comprising:
receiving, over a unicast channel of the first RAT, an overhead message that is associated with the second RAT.

26. The method of claim 24, further comprising:
receiving one or more system parameters, wherein the one or more system parameters are associated with the second RAT.

27. The method of claim 26, further comprising:
receiving the one or more system parameters over the communication tunnel in a unicast manner; and
communicating, based on the one or more system parameters, with the wireless communication system over the second RAT.

28. An apparatus, comprising:
transceiver circuitry to communicate with a wireless communication system via multiple radio access technologies (RATs), wherein the wireless communication system includes a first RAT and a second RAT; and
processor electronics configured to (i) communicate with the wireless communication system via the first RAT to receive, over a unicast channel of the first RAT, one or more overhead messages via a communication tunnel that is associated an interworking overhead message protocol, the one or more overhead messages being associated with a second RAT of the wireless communication system, (ii) use the one or more overhead messages to operate a protocol stack associated with the second RAT, and (iii) communicate, based on the protocol stack, with the wireless communication system via the second RAT,
wherein the communication tunnel is associated with an instance of the interworking overhead message protocol created for a single mobile device, wherein the wireless communication system operates the instance to switch from an inactive state to a tunnel active state in response to a signaling message associated with the second RAT and the mobile device.

29. The apparatus of claim 28, wherein the first and second RATs are based on different radio access technologies.

30. The apparatus of claim 28, wherein the transceiver circuitry is further configured to:
receive one or more system parameters, wherein the one or more system parameters are associated with the second RAT.

31. The apparatus of claim 30, wherein the transceiver circuitry is further configured to receive the one or more system parameters over the communication tunnel in a unicast manner; and the processor electronics is further configured to communicate, based on the one or more system parameters, with the wireless communication system over the second RAT.

* * * * *